G. B. PETSCHE.
EXHAUST VALVE FOR GAS ENGINES.
APPLICATION FILED MAR. 7, 1906.

989,536.

Patented Apr. 11, 1911.

UNITED STATES PATENT OFFICE.

GUSTAV B. PETSCHE, OF PHILADELPHIA, PENNSYLVANIA, ASSIGNOR TO SOUTHWARK FOUNDRY AND MACHINE COMPANY, OF PHILADELPHIA, PENNSYLVANIA, A CORPORATION OF PENNSYLVANIA.

EXHAUST-VALVE FOR GAS-ENGINES.

989,536.  Specification of Letters Patent.  Patented Apr. 11, 1911.

Original application filed December 30, 1904, Serial No. 238,917. Divided and this application filed March 7, 1906. Serial No. 304,626.

*To all whom it may concern:*

Be it known that I, GUSTAV B. PETSCHE, a subject of the Emperor of Germany, residing in the city and county of Philadelphia, in the State of Pennsylvania, have invented a certain new and useful Improvement in Exhaust-Valves for Gas-Engines, of which the following is a true and exact description, reference being had to the accompanying drawings, which form a part thereof.

My invention relates to exhaust valves for gas engines and has for its object to provide for the convenient assembling and removal of the parts making up the exhaust valve.

My valve is one in which the valve casing has a cylindrical valve bearing at its top and a removable seat supporting portion at its bottom and the valve has a cylindrical bearing portion and a seat engaging portion, said valve being adapted to be inserted and removed through the bottom of the casing when the seat supporting portion is removed. By preference the seat supporting portion of the casing has a cylindrical extension to form a slip joint with the end of the exhaust conduit into which it telescopes when withdrawn for the insertion or removal of the valve.

Figure 1:
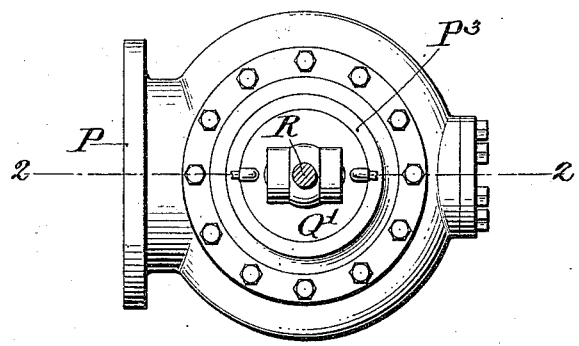
Figure 2:
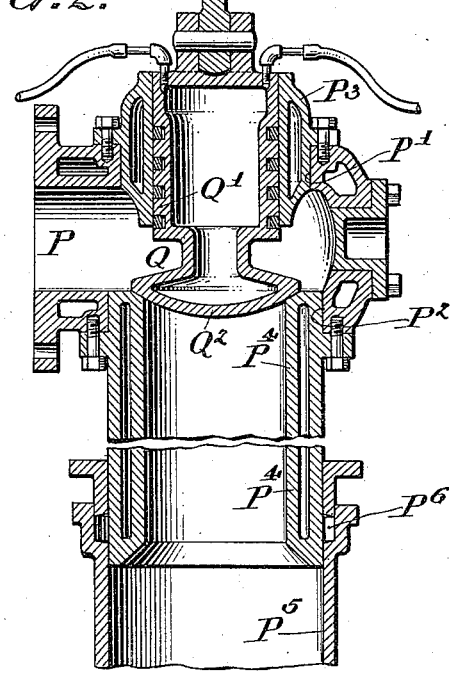

In the drawing which illustrates my invention, Figure 1, is a top view of the valve, and Fig. 2, a vertical section on the line 2—2 of Fig. 1.

P, is the main body of the casing formed, as shown, with cylindrical openings P', and P², at top and bottom, P³, is a cylindrical guideway fitting in the opening P'; P⁴, a cylindrical seat supporting portion fitting in the opening P², the upper end of the said support forming the seat and the support being continued in cylindrical form into and so as to form a slip joint with the end P⁵, of the exhaust conduit, P⁶, indicating a stuffingbox.

Q, is the valve made up of a cylindrical guide portion Q', which fits and slides in the guideway P³, and a valve portion proper indicated at Q², which is adapted to seat itself on the removable seat, as shown.

R, indicates the valve actuating rod.

When it is desired to insert the valve into the casing the seat portion P⁴, is detached from the main body P of the casing and pushed down into the end of the exhaust pipe. The valve is then inserted into the opening in the bottom of the casing and afterward the seat supporting portion returned to and secured in its normal operative position. The valve is of course removed by a similar manipulation of the parts.

The valve structure forming the subject matter of this application is shown in my former application for Letters Patent No. 238,917, filed December 30th, 1904, of which case the present one is a division.

Having now described my invention, what I claim as new and desire to secure by Letters Patent is,

1. A gas engine outlet valve, comprising in combination, a valve casing having a cylindrical valve bearing at its top and a removable seat supporting portion at its bottom of greater cross sectional area than the valve and formed with a lateral inlet passage, and a valve having a cylindrical portion fitting in said valve bearing and adapted to be inserted and removed through the bottom of the casing when the seat support portion is removed.

2. In a gas engine, an outlet valve casing having an opening at its bottom for the insertion and removal of the valve, in combination with an exhaust conduit situated below and at some distance from the casing, and a removable valve seat having a cylindrical extension forming a slip joint with the exhaust conduit.

GUSTAV B. PETSCHE.

Witnesses:
ARNOLD KATZ,
D. STEWART.

Copies of this patent may be obtained for five cents each, by addressing the "Commissioner of Patents, Washington, D. C."